(12) United States Patent
Schneider et al.

(10) Patent No.: US 11,878,785 B2
(45) Date of Patent: Jan. 23, 2024

(54) MODULAR LINE ASSEMBLY FOR INSTALLATION IN AN AIRCRAFT FUSELAGE

(71) Applicant: Airbus Operations GmbH, Hamburg (DE)

(72) Inventors: Frank Schneider, Hamburg (DE); Frederik Albers, Hamburg (DE); Sonja Pawellek, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/973,832

(22) Filed: Oct. 26, 2022

(65) Prior Publication Data

US 2023/0139167 A1 May 4, 2023

(30) Foreign Application Priority Data

Oct. 28, 2021 (EP) .................................. 21205381

(51) Int. Cl.
*B64C 1/06* (2006.01)
*B64F 5/10* (2017.01)
(Continued)

(52) U.S. Cl.
CPC ............... *B64C 1/068* (2013.01); *B64F 5/10* (2017.01); *F16L 3/02* (2013.01); *F16L 3/221* (2013.01)

(58) Field of Classification Search
CPC ........................... B64C 1/068; B64C 2211/00
See application file for complete search history.

(56) References Cited

U.S. PATENT DOCUMENTS 4,063,315 A * 12/1977 Carolan ................ E03D 5/016
4/316
10,822,774 B2    11/2020 Lubbert et al.
(Continued)

FOREIGN PATENT DOCUMENTS

DE             9306143 U1      7/1993
DE     202007000256 U1 *  4/2007    ......... A47B 96/1425
(Continued)

OTHER PUBLICATIONS

DE-202007000256-U1 English translation (Year: 2007).*
European Search Report dated Mar. 25, 2022; priority document.

*Primary Examiner* — Jason L Vaughan
*Assistant Examiner* — Amanda Kreiling
(74) *Attorney, Agent, or Firm* — Greer, Burns & Crain, Ltd.

(57) ABSTRACT

A line assembly for installation in an aircraft fuselage includes a first line section having a first diameter, a second line section having a second diameter, a set of first line brackets, and a set of second line brackets. The first line brackets include a first receiving space configured to hold the first line section and a first support portion for attaching the first line brackets to a fuselage structural part. The second line brackets include a second receiving space configured to hold the second line section and a second support portion for attaching the second line brackets to the first line section. The second line section includes a higher flexibility than the first line section. The second line section is attached to the first line section through a plurality of second line brackets arranged at a distance to and independent from the first line brackets.

20 Claims, 6 Drawing Sheets

(51) Int. Cl.
*F16L 3/02* (2006.01)
*F16L 3/22* (2006.01)

(56) References Cited

U.S. PATENT DOCUMENTS

2011/0108150 A1    5/2011  Renaud
2018/0277285 A1*   9/2018  Stilwell .................... H02G 3/30
2020/0318671 A1*  10/2020  Jochum ............... B60R 13/0212

FOREIGN PATENT DOCUMENTS

EP    3385163 A1     10/2018
EP    2499413 B1 *   9/2019  .............. F01P 11/04
EP    2499413 B1     9/2019

* cited by examiner

US 11,878,785 B2

MODULAR LINE ASSEMBLY FOR INSTALLATION IN AN AIRCRAFT FUSELAGE

CROSS-REFERENCES TO RELATED APPLICATIONS

This application claims the benefit of the European patent application No. 21205381.3 filed on Oct. 28, 2021, the entire disclosures of which are incorporated herein by way of reference.

FIELD OF THE INVENTION

The invention relates to a line assembly for installation in an aircraft fuselage, an aircraft, as well as a method for installing a first line section and at least one second line section in an aircraft.

BACKGROUND OF THE INVENTION

In common commercial aircraft, usually galley and sanitary equipment is installed. These require a potable water system for providing fresh water in a sufficient amount and quality. The potable water is commonly stored in a centralized water tank and is distributed via a pipe network. In conventional system architectures stainless steel or titanium pipes having a diameter between 0.5 inches and 0.75 inches are used. However, high and low pressure potable water pipes are known, which are based on flexible hoses from a plastic material, such as PEEK, wherein the high pressure hoses comprise an outer diameter of, e.g., 6 mm. Furthermore, usually a vacuum toilet system is installed, based on a pneumatic transport system, which serves for the hygienic disposal of human waste. For this, the differential pressure between the cabin and outside air is used to convey waste through a titanium pipe, which may comprise a diameter of 2 inches, to a central waste tank. Still further, usually a waste-water system is installed, which is used to drain waste-water, e.g., from wash basins, via the heated drain masts, overboard.

Although potable water lines and pipework of the vacuum toilet system are laid in parallel between the water/waste storage tanks and the lavatory monuments, each of these sub-system installations is mounted separately to the aircraft structure with its own brackets. This results in a relatively high number of interface points to the aircraft structure. In case of customer-specific monument positions due to individual cabin layouts, each of these sub-systems needs to be separately adapted to the new location with a correspondingly high level of effort.

Above-mentioned water supply hoses allow a reduction of the installation effort, weight, and complexity. On the one hand, the elastic properties of such hoses are of high advantage for the installation process. On the other hand, they may require modified bracket distances instead of using conventional bracket distances, which are specified by the spacing between structural elements in the aircraft fuselage, e.g., frame or z-strut spacing. Overall, the common installation method induces high costs in terms of aircraft design and production due to the required installation and customization effort.

EP 3 385 163 A1 and U.S. Pat. No. 10,822,774 B2 show an aircraft comprising a high-pressure water supply and distribution system.

SUMMARY OF THE INVENTION

An object of the invention is to propose an improved installation for lines or similar system installations on board commercial aircraft to avoid at least some of the aforementioned constraints.

A modular line assembly for installation in an aircraft fuselage is proposed, the assembly comprising a first line section having a first diameter, at least one second line section having a second diameter, a set of first line brackets, and a set of second line brackets, wherein the first line brackets comprise a first receiving space designed for holding the first line section and a first support portion for attaching the first line brackets to a structural part of the fuselage, wherein the second line brackets comprise a second receiving space designed for holding the at least one second line section and a second support portion for attaching the second line brackets to the first line section, wherein at least one second line section comprises the same or higher flexibility than the first line section, and wherein the at least one second line section is attached to the first line section through a plurality of second line brackets that are arranged at a distance to and are independent from the first line brackets.

The first line section comprises a first line for conveying a medium, such as air, a gas or gas mixture in general, water, waste-water, or waste. The first diameter may refer to an outer diameter of the first line section. For example, the first line section may refer to a vacuum line. Also, other pipes with a large diameter, e.g., waste-water piping, which are to be installed in the cabin and cargo area, can be used as a base element for the second line sections. This is in particular of advantage if there is no vacuum system interface present at a monument, as it is the case with galleys. The at least one second line section is independent from the first line section and comprises a second line for conveying a medium. The second line section may also be designed to convey a medium, wherein the medium in the second line section may differ from the medium in the first line section. For example, the second line section may refer to a potable water line.

The first line section and the first line brackets are designed to conform each other, such that the first line brackets are capable of holding, e.g., enclosing or at least partially enclosing, the first line section for supporting the first line section on the fuselage. For this, the first line brackets each comprise a first receiving space that is designed to receive the first line section. Besides form-locking principles, i.e., positive fit connections, also non-positive fit connections, or material-bonding connections, such as gluing or welding, are possible. The first support portion is designed to be attachable to the respective structural component of the fuselage. Thus, by attaching the first line brackets to the structural component and holding the first line section by the first line brackets, the first line section is attached to the structural component.

The first support portion is not to be considered a separate part. Instead, it may be a portion, i.e., a surface, a section or a dedicated region of the first line bracket that is somehow attached to a structure. If the first bracket is attached to the structure, there will be a portion of it interacting with the structure, be it a surface to bond to an adhesive, a positive or non-positive connection.

It is preferred that a plurality of first line brackets holds the first line section. The first line brackets are arranged in a predetermined spacing along the fuselage, which may be determined by the spacing of stiffening components of the fuselage. For example, the first line brackets are attached to frame components, which are usually substantially circumferential profile parts defining a surface that is arranged normal to a longitudinal axis of the respective fuselage. The first line brackets may also be designed for an attachment to longitudinal stiffening elements, i.e., stringers or the like. However, other variants or combinations thereof are possible.

A gist of the invention lies in providing the second line brackets, which are capable of holding the at least one second line section. The second support portions are, however, not designed to be attached to the structural part, but to the first line section. Thus, an assembly of a second line and a first line, which are connected to each other, may be provided. Here, the at least one second line section comprises a higher flexibility than the first line section. In the modular line assembly, the installation of first lines, e.g., vacuum lines, and second lines, e.g., potable water lines, are combined into one installation unit. In this installation unit the first line is attached to the aircraft structure as a base element in a known manner using standard bracketing in the form of the first line brackets. As an add-on element the second line is attached to the first line.

At least one and preferably all of the first line brackets and the second line brackets may be made from a plastic material, depending on the size, and expected loads on the first and second line sections. It is conceivable that between two consecutive first line brackets, a plurality of second line brackets are placed. A group of a plurality of second line brackets may then be enclosed by two consecutive first line brackets. The first and/or second line brackets may be arranged in an equidistant manner, such that intermediate spaces between two first and/or second line brackets are equal.

The modular line assembly according to the invention offers several advantages in comparison with known solutions. First of all, the number of required interface points between an aircraft structure and water system installations or other line arrangements can be drastically reduced. By creating a combined installation unit as mentioned above, only interfaces for the first line section with the aircraft structure need to be installed. Aircraft structural interfaces for the installation of the second line are nearly completely eliminated.

Also, the efforts required to adapt a system to customer-defined monument positions are reduced. Since the second line, e.g., potable water line, may commonly be installed along the first line, e.g., lines of the vacuum toilet system, the routing results from this relationship and there is no need to plan the line routes separately. This clearly reduces the adaption effort for customer defined monument positions for a water/waste system or similar by around one half.

Distances between brackets attached to the aircraft structure design are decoupled from the distances of two consecutive second line brackets, such that an arbitrary bracket spacing for water lines or other second line sections is enabled. Since there is no direct interface between the aircraft structure and the second line sections, the incremental design of the aircraft structure is no longer relevant for the distance between two brackets. Rather, nearly any bracket spacing can be achieved, since the first line section, e.g., a vacuum line, may be routed continuously between the waste tank and lavatory monuments. This corresponds to a complete decoupling process. The positioning of the second line brackets is only restricted by other elements which are installed to the first line section, such as first line brackets, bonding straps, or couplings. Buckling of the second hose section due to large unsupported lengths between two brackets and due to relative deformations in a longitudinal direction are avoided.

The assembly allows to limit an unsupported pipe length to an acceptable value and thus simply avoids sagging or buckling effects of flexible second line sections. Water pockets residual water in gravity drained water systems can thus be avoided. The possibility of an arbitrary spacing of second line brackets for the installation of flexible second lines, e.g., water hoses, without the need for additional interfaces to the aircraft structure, offers the possibility of setting the unsupported pipe length between two second line brackets to an acceptable value, which is not critical in terms of sagging and buckling effects.

Due to the freely selectable second line bracket spacing, vibration amplitudes can also be minimized. It is conceivable that the second line brackets may also comprise a spring-damper element, such that the transmission of vibrations to the first line section or the aircraft structure can be further reduced. Pressurization, or influences by the operation of the aircraft, e.g., wind milling, will not lead to a physical contact of the second line sections with neighboring systems/structures. Thus, disruptive noise or vibration effects leading can be avoided.

Also, a pre-assembly of the modular line assembly is possible, for example in a triangle module underneath a cabin floor at a lateral region directly adjacent the fuselage wall. In particular, the modular line assembly according to the invention solves the above-identified object in that it eliminates the need for additional support structures or brackets mounted to the aircraft structure, system/structure interfaces or complex mounting brackets which would lead to disadvantages regarding weight, installation space and cost.

A plurality of consecutively arranged first line sections may be coupled with each other through a coupling. It is conceivable that in the pipework of a vacuum toilet system, deformations relative to the aircraft structure are compensated through the couplings. It is preferred that the couplings are flexible. This allows a certain expansion or compression in longitudinal direction of the aircraft fuselage. Accordingly, the second line section, which is installed to a first line section in form of a vacuum pipe, also needs to provide such a deformability.

For achieving this, the second line section may be installed in a non-straight manner. For example, the second line section may comprise at least one bend that allows expansion and compression movements. It is conceivable to provide bends in a periodical manner along the second line section. In this regard it is noted that the second line section or lines installed inside an aircraft should be as long as possible, i.e., in one piece, to reduce the installation effort for interface points and to prevent potential leaking points.

As an alternative, compensation elements, similar to couplings of a vacuum line, may be installed. However, this would reduce the maximal length of the second line sections and may increase additional second line brackets. As stated further below, this may require at least one second line bracket to allow a movement of the respective second line section.

At least one second line bracket may be arranged between two consecutive first line brackets. However, it is preferred that a plurality of second line brackets is arranged between two consecutive first line brackets. Since the second line section has a higher flexibility than the first line section it may be advantageous to install at least two or more second line brackets between two consecutive second line brackets, i.e., a higher number of second line brackets than first line brackets per length.

However, providing at least one second line bracket between two consecutive first line brackets is not mandatory and mainly applies to straight sections of the first line section. It is possible to deviate from this for curved sections, pipe branches or the like and two first line brackets may follow one another, between which there is no second line bracket.

The at least one second line section may comprise at least one bend. For example, the bend may be arranged in an overlapping region with one of the first line brackets and/or another component. Such an overlapping region is to be understood as a region where the respective second line section passes the respective first line bracket or component. The bend may also be placed in a region of a branch or a change of direction or pipe bend of the first line section. The term "another component" may refer to another system component, a coupling between consecutive first line sections, an elbow or branching of the first line section or other. The bend may be based on an overlength of the second line section, which leads to bending the second line section to change its orientation relative to the first line section. Exemplarily, a first line bracket or another component may thus be surrounded. By using the bend both line sections may be installed very close to each other. The bend also allows to compensate length variations due to temperature or pressure induced expansion or compression effects. The at least one bend is preferably elastic such that the second line section may expand, compress, and deform along the bend.

For supporting the creation of the at least one bend, there may be second line brackets having a second receiving space that is slightly rotated, e.g., up to 15° or 30° in opposite directions in order to force the second line section, which should be flexible enough, into a bend.

In an advantageous embodiment, the second support portion is adapted to glide and/or rotate on the first line section for compensating expansion and/or compression movements of the at least one second line section. Further, the second support portion may be configured to have a rotation mechanism integrated therein, rather than having the second support portion being rotatable on the first line section. That is, a portion of the second support portion may be fixed relative to the first line section, while another portion of the second support portion may rotate relative to the first line section. In particular, when the at least one bend is created, the second line brackets may be able to rotate about the local extension axis of the respective first line section. The respective bend may decrease in size when the second line section is compressed, while it may increase in size when the second line section expands. By letting the second support portion rotate about the respective first line section, this change in size is compensated. It is conceivable that the second support portion exerts only insignificant resistance to a relative movement to the first line section, so that compensation can always be performed.

It is conceivable that the first diameter exceeds the second diameter. Thus, the first line section having the larger diameter is directly attachable to the structure and provides a rigid base for the second line section.

The second line brackets may comprise a clamp that encloses the first line section in a plier-like manner. Such a clamp may thus surround the first line section at least partially, e.g., about at least 60%. By arresting the clamp in a state in which it encloses the first line section, the second line bracket is rigidly attached to the first line section. It may be feasible to completely surround the circumferential surface of the first line section by tightening the clamp on a side opposite to the second line section. For example, the clamp may be similar to a hose clamp.

The second line brackets may comprise a stiction layer in direct contact with a surface of the first line section. The stiction layer increases the stick friction coefficient and may be based on a thin layer of a rubber-like material. It may be bonded to the second line bracket or to the first line section through an adhesive material, through an adhesive tape or the like. It is also conceivable that the stiction layer is a separate component that is simply embedded between the first line section and the second line bracket.

The second line brackets may be designed for holding a plurality of second line sections. Thus, a plurality of second line sections are supportable by a single second line bracket, e.g., through a plurality of second receiving spaces integrated therein.

It is advantageous if the second line brackets comprise at least one snap-in connector for holding the at least one second line section. The respective second line section may simply be advanced to the snap-in connector and pressed firmly onto it, such that the snap-in connector allows the second line segment to pass into the respective second receiving space to be held therein.

Furthermore, the second receiving space and the second support portion may be provided in a base component and a top component, wherein the base component and top component are connectable to each other through a releasable connector. For example, both components may be connected through a click connector. The releasable connector may include a mechanism that securely latches upon pressing the base component and the top component onto each other. The connector may also comprise a release device, which is adapted for releasing the latched connection.

As stated above, the first line section may comprise a vacuum pipe, and the at least one second line section may comprise at least one water hose. The vacuum pipe may be associated with a vacuum toilet system, while the water hose may be associated with a water consuming apparatus in a lavatory or galley monument.

It is conceivable that the first line section is substantially rigid. Exemplarily, it may comprise a metal pipe, such as from titanium, aluminum, steel, stainless-steel, or other suitable, light-weight metal materials. However, a plastic material may also be suitable, in particular a fiber-reinforced plastic material. Still further, also any hybrid material comprising fractions of metal and plastic material is possible.

At least one of the at least one second line brackets may allow a relative motion of the second line section along a main extension direction of the second line section. Thus, longitudinal expansion and compression movements of the at least one second line section relative to the first line section is allowed. In order to not have a completely moveable system, at least one second line bracket should be provided as a fixed bearing, if the fixed configuration is not already defined by a ramification of the second line sections, e.g., a water distribution network.

It is further conceivable that at least one first line bracket is equippable with a top component mentioned above, such that the respective first line bracket is a hybrid bracket for accommodating a second line section in addition to the first line section.

Furthermore, a second line bracket, which is installed before or after a bend of the first line section, may be provided with a cantilevering support structure that forces the respective second line section into the curvature of the bend, similar to a bridge. This may particularly be important if the second line section does not readily assume the course of a bend due to its rigidity.

The invention also relates to an aircraft, comprising a fuselage having an interior space, and at least one modular line assembly according to the above description.

The invention further relates to a method for installing a first line section and at least one second line section in a fuselage of an aircraft, comprising attaching a first line section having a first diameter to a structural part of the fuselage through first line brackets, which comprise a first receiving space designed for holding the first line section and a first support portion for attaching the first line brackets to the structural part, attaching at least one second line section having a second diameter to the first line section through second line brackets, which comprise a second receiving space designed for holding the at least one second line section and a second support portion for attaching the second line brackets to the first line section, wherein at least one second line section comprises the same or higher flexibility than the first line section, and wherein the at least one second line section is attached to the first line section through a plurality of second line brackets that are arranged at a distance to and are independent from the first line brackets.

In the method, the second line brackets may be pre-installed to the first line section. However, it is conceivable that the second line brackets may be attached to the first line section after installation of the first line section. As stated above, fixed and movable second line brackets may be used. When installing a bend in the second line section, the movable second line brackets may be rotated about an angle about the central axis of the first line section. The angle between the rotated second line bracket and the fixed second line brackets is larger than zero.

The method also supports a pre-assembly in a module. In a first step, the first line section, e.g., vacuum pipes, with their limited element lengths and provided with the second line brackets for the second line sections can be mounted on a module structure to be installed in the aircraft. In a second step, the more flexible second line sections, e.g., water hoses, can be installed along the first line sections without the need for installation-related coupling points. In the best-case scenario, the second line sections are installed without tools, comparable to the installation of a cable. This may be achieved without the need for cost-intensive special parts. With the exception of the second line brackets between the first line sections and the second line sections, existing standard parts can be reused.

It is also conceivable that the second line section comprises valves, sensors, fittings, e.g., elbows, t-pieces, couplings, or the like, which are also mounted on the first line section through dedicated brackets.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements.

DETAILED DESCRIPTION OF THE PREFERRED EMBODIMENTS

Figure 1:
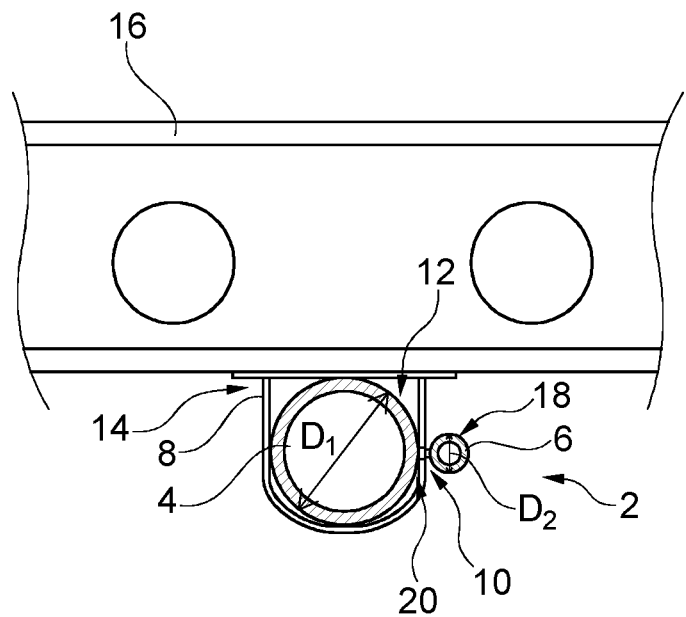
FIG. 1 shows a modular line assembly in a sectional view.

FIG. 1 shows a modular line assembly 2 in a sectional view for installation in an aircraft fuselage. The modular line assembly 2 comprises a first line section 4 having a first diameter D1, a second line section 6 having a second diameter D2, a first line bracket 8 and a second line bracket 10. The first line bracket 8 comprises a first receiving space 12 designed for holding, and in this example enclosing, the first line section 4. A first support portion 14 is coupled with the first receiving space 12 and is designed for attaching the first line bracket 8 to a structural part 16 of the fuselage. It may comprise a spacer or damper or intermediate piece for increasing the contact surface with the structural part 16. Here, the structural part 16 is shown as a part of a cross-beam for support of a cabin floor. However, circumferential frames or z-struts or any other primary or secondary structure element is also possible. The first line bracket 8 is designed as an Omega-shaped clamp, which firmly hold the first line section 4 on the frame 16. It is to be understood, that a plurality of first-line brackets 8 are used for holding the first line section 4.

The second line bracket 10 comprises a second receiving space 18 designed for holding, e.g., enclosing, the second line section 6 and a second support portion 20 attaching the second line bracket 10 to the first line section 4. The second line bracket 10 is shown in more detail in figures further below.

The modular line assembly 2 allows to attach a second line section 6 to the first line section 4, such that no further structural interfaces are required for holding the second line section 6 relative to the structural part 16. This allows an improved flexibility in the placement of monuments and installing systems that are adapted to the individual requirements of an aircraft operator.

Figure 2:
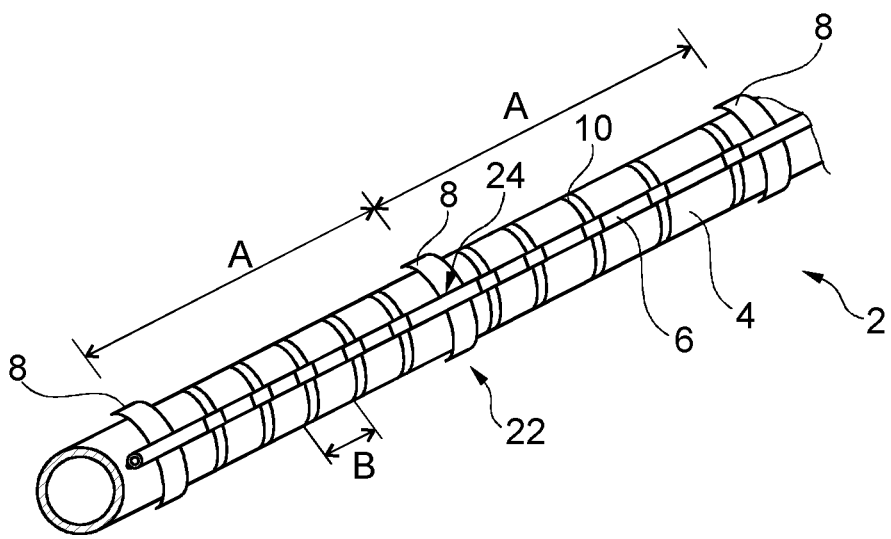
FIG. 2 shows a modular line assembly in a three-dimensional view.

FIG. 2 shows the first line section 4 in a three-dimensional view. It is held on the structural part 16 by exemplarily three first line brackets 8. The first line brackets 8 are spaced apart by a distance A, wherein it is advantageous to provide an equidistant arrangement of the first line brackets 8. The second line section 6 is attached through a plurality of second line brackets 10 to the first line section 4, wherein the second line brackets 10 are spaced apart by the distance B. Here, the distance B is clearly lower than the distance A, such that between two consecutive first-line brackets 8 a plurality of second line brackets 10 are placed. In this example, five second line brackets 10 are placed between two consecutive first-line brackets 8.

An overlapping region 22 is created, where the second line section 6 passes a first line bracket 8, a pipe coupling of the first line section 4, installations of other aircraft systems, other structural elements, or the like. In the overlapping region 22, the second line section 6 may optionally comprise a bend 24. Further examples of the bend 24 are further shown in FIGS. 3 and 4.

Figure 3:
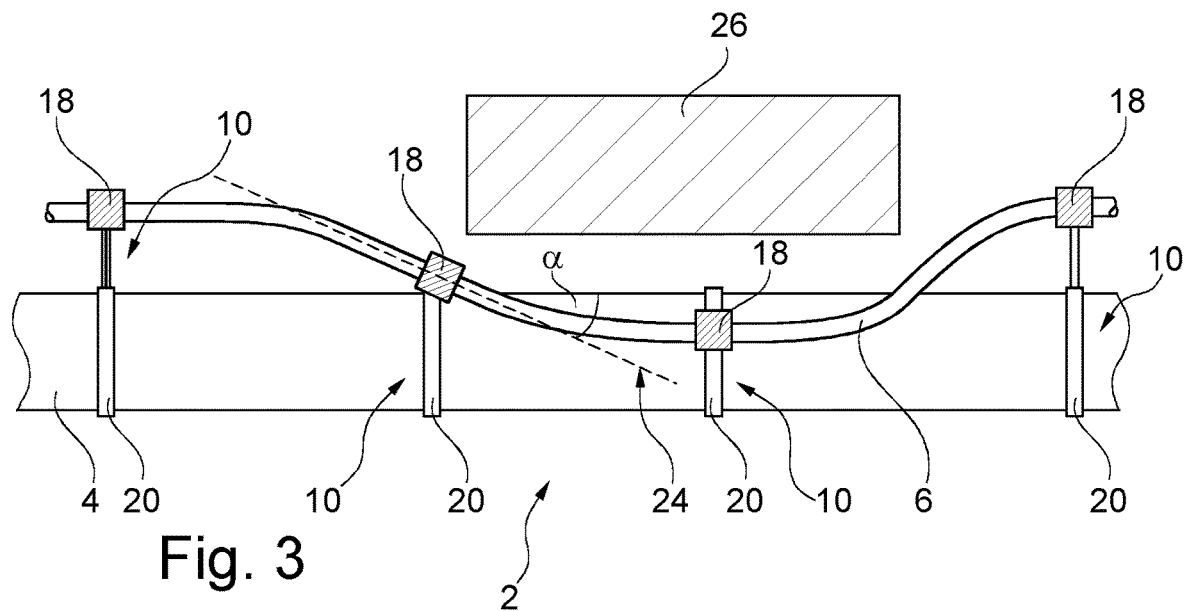
FIGS. 3, 4a and 4b show bends in a line assembly.

FIG. 3 shows the modular line assembly 2, where the second line section 6 has a bend 24 in an overlapping region with a system component 26. Here, the system component 26 is avoided through the second line section 6 bypassing it in a sufficient distance to avoid damages to the system component 26 or the second line section 6. For this, the second line brackets 10 are adapted to comprise different distances to the first line section 4 or to provide different orientations to the first line section 4. For example, one of the second support portions 20 of the second line brackets 10 is adapted in its orientation, such that a respective local extension of the second line section 6, indicated with a dashed line, is arranged at an angle α to an extension of the first line section 4. Due to its flexibility, the second line section 6 provides a smooth curvature and thus forms the bend 24.

Figure 4A:
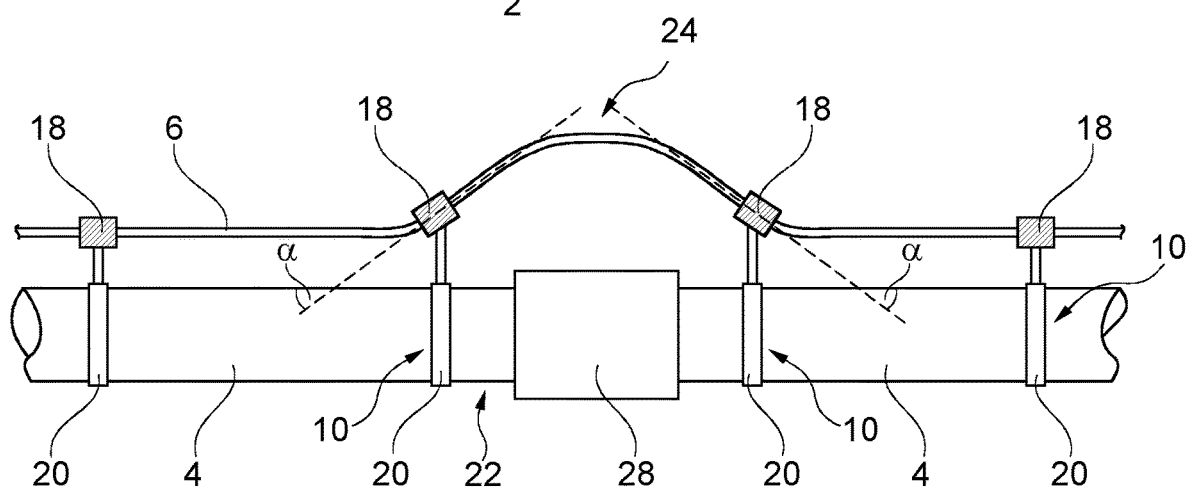

In FIG. 4a the overlapping region 22 is created at a coupling 28 between two consecutive first line sections 4. Here, two consecutive support portions 18 are oriented in such a way that a local extension of the second line section 6 is arranged at an angle α relative to the first line section 4. Exemplarily, the respective support portions 18 are arranged in a mirror-inverted way.

Figure 4B:
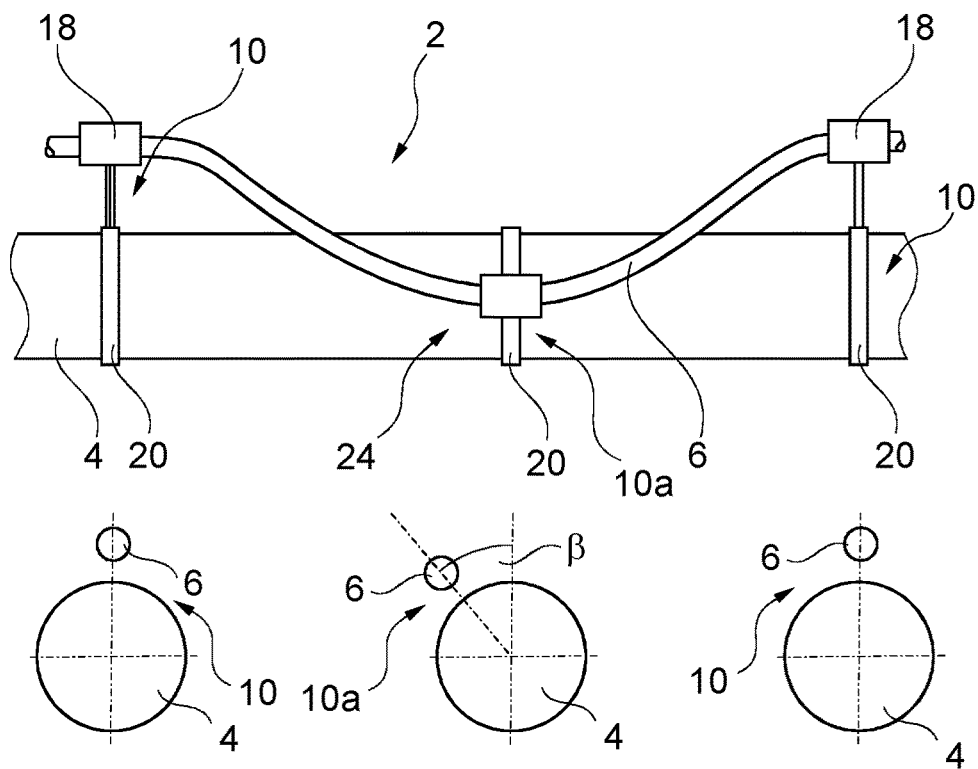

For second line sections 6 having a reduced flexibility, the support portions 18 could be designed differently in order to avoid high structural stresses onto the support portions 18 induced by the second line section 6. FIG. 4b shows a modified embodiment with a bend 24 having a larger bending radius that is suitable for stiffer second line sections 6.

The bend 24 is provided by deflecting one of the second line brackets 10, which is marked as second line bracket 10a, by an angle β around the first line section 4 during installation. For example, the angle β may be up to 45°. Still further, at least one of the other second line brackets 10 may be fixedly attached to the first line section 4. It is conceivable that both other second line brackets 10, which are placed next to the movable second line bracket 10a at opposite sides, are fixed.

It is further conceivable that the movable/rotatable second line bracket 10a is able to pivot about a center line of the first line section 4. Also, it is conceivable that the range of rotation is limited to avoid jamming of the second line section 6 upon excessive angles β. To achieve this, for example, the rotation may be limited to angles of +/−30°. However, other limits, i.e., lower or greater limits, are possible.

In the event that the first line section 4 stretches in the longitudinal direction, traction forces may arise in the second line section 6 and on the fixed second line brackets 10, which causes the bend 24 to decrease in size. This is achieved through a rotation of the respective second line bracket 10a towards a smaller angle β compared to the initial installation position. However, if the first line section 4 is compressed in the longitudinal direction, the bend 24 increases in size to compensate the increased overlength of the second line section 6. Thus, the second line bracket 10a rotates to an increased angle β compared to the initial installation position. FIG. 4b shows the different orientations of the second line brackets 10 and 10 in a lateral view as well as a schematic front view, in the viewing direction of the central axis of the first line section 4.

The relative movement between the first line section 4 and the second line section 6 may be generated by various causes. For example, due to a different thermal expansion coefficient between first line section 4 and second line section 6 due to the use of different materials; due to a flexible coupling in the first line section 4 that allows compensation of deformations in the mechanical assembly of first line section 4 and a structural part, in longitudinal and angular direction; due to different temperatures of and/or inside the first line section 4 and the second line section 6; due to different pressure conditions in the first line section 4 compared to the second line section 6, e.g., a negative pressure in the first line section 4 and a positive pressure in the second line section 6.

The rotary movement in the second line bracket 10a may be implemented between the respective second line bracket 10a and the first line section 4 or it may be provided as a part of the second support portion 20. For example, the second support portion 20 may have a portion that rotates about the first line section 4 relative to another portion of the second support portion 20, such as a movable ring portion rotating on a fixed ring portion, or a flexible portion, such as an arm, that moves relative to a fixed portion so that the second line bracket 10 may move through an arc relative to the first line section 4. Other directions of movement and rotation shall be blocked or released. It is clear that along the first line section 4 several arrangements of fixed second line brackets 10 and rotatable second line brackets 10a is possible.

Figure 5:
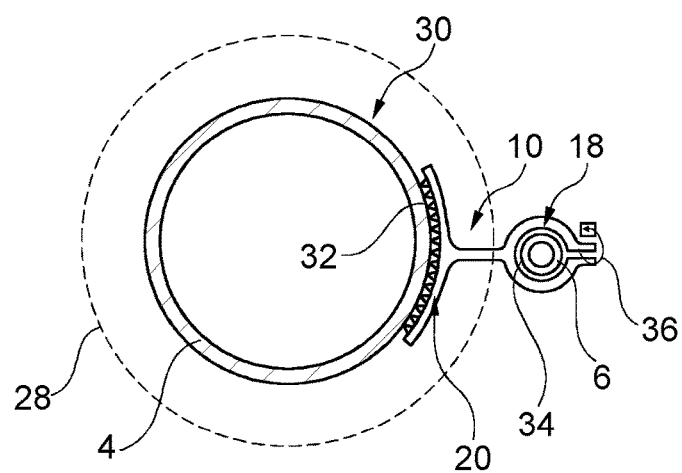
FIGS. 5 to 7 show examples of second line brackets.

FIG. 5 shows the first line section 4 with the second line bracket 10 attached to it. Here, the support portion 20 is bonded to a circumferential surface 30 of the first line section 4 through an adhesive 32. In a distance to the support portion 20, the second receiving space 18 is provided to receive the second line section 6. Here, the second line section 6 is surrounded by a dampening layer 34. The receiving section 18 exemplarily comprises a cable tie 36 or another releasable fastening device to tighten the second line bracket 10 to the second line section 6. The coupling 28 from FIG. 4 is indicated with dashed lines. Exemplarily, the second line section 6 is arranged in a distance to the first line section 4 such that the second line section 6 is arranged outside the contour of the coupling 28.

Figure 6:
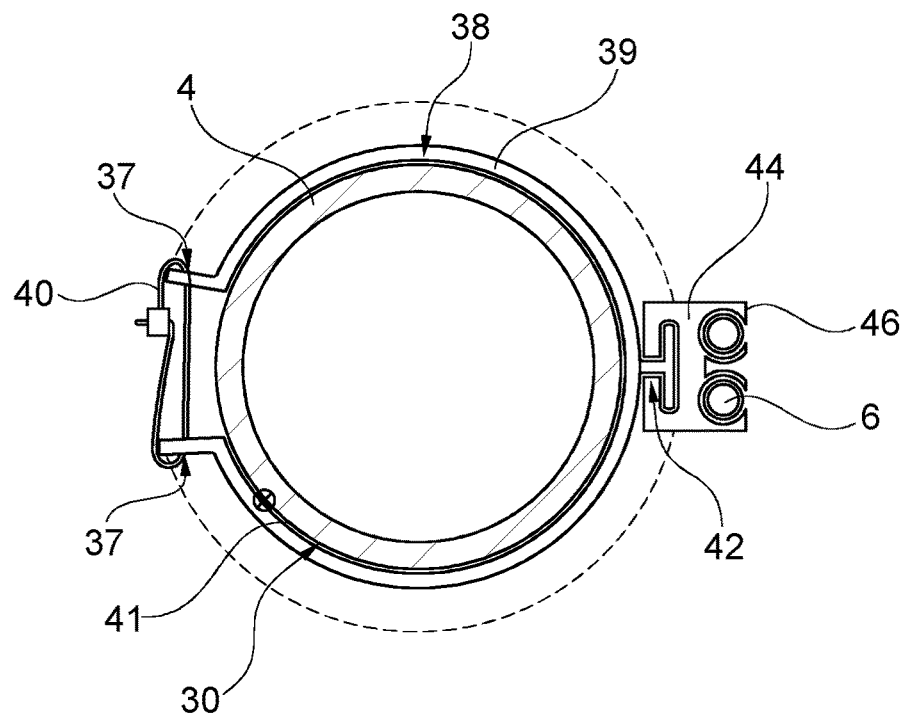

FIG. 6 shows another second line bracket 38, which exemplarily completely encloses the first line section 4 through a base component 39, which has a C-shape compatible with the first line section 4, such that it is snappable onto the first line section 4 and secured/tensioned by a cable tie 40 arranged in two through-holes 37 at opposite ends of the base component 39. A click connector 42 is provided to attach a top component 44 to the base component 39. The top component 44 comprises a snap-in connector 46 for receiving two second line sections 6.

Figure 7:
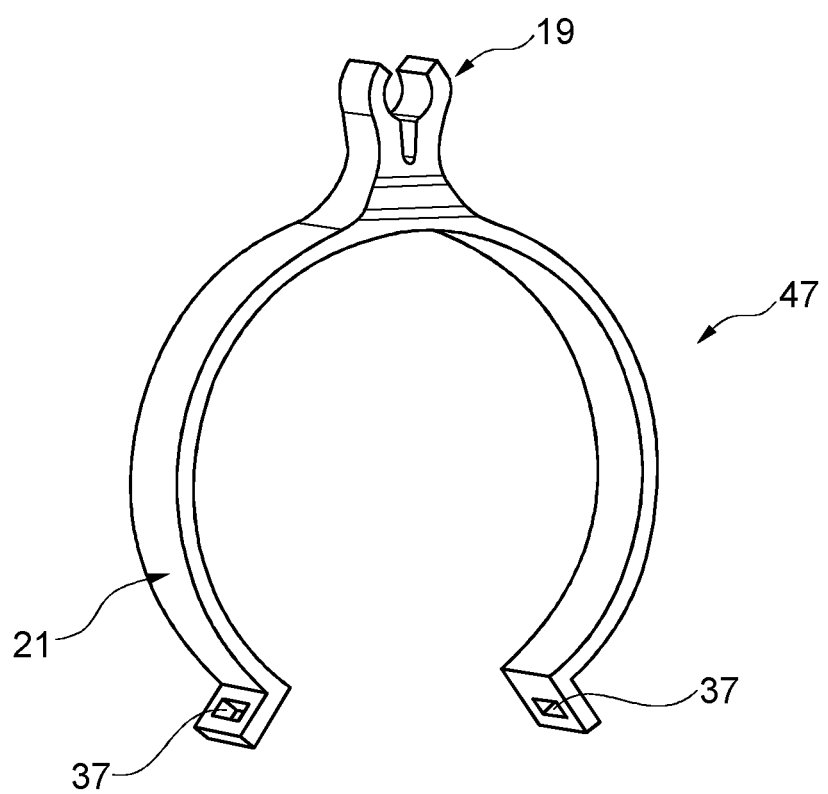

FIG. 7 shows a further second line bracket 47 having a second support portion 21 and a second receiving space 19. The second receiving space 19 is designed in the form of a snap-in connector, such that the second line section 6 is simply snappable into the second receiving space 19. The second support portion 21 exemplarily comprises a C-shape and can be snapped onto the first line section 4 and is securable through a cable tie or the like, which can be placed through two through-holes 37, comparable to the embodiment shown in FIG. 6.

Figure 8:
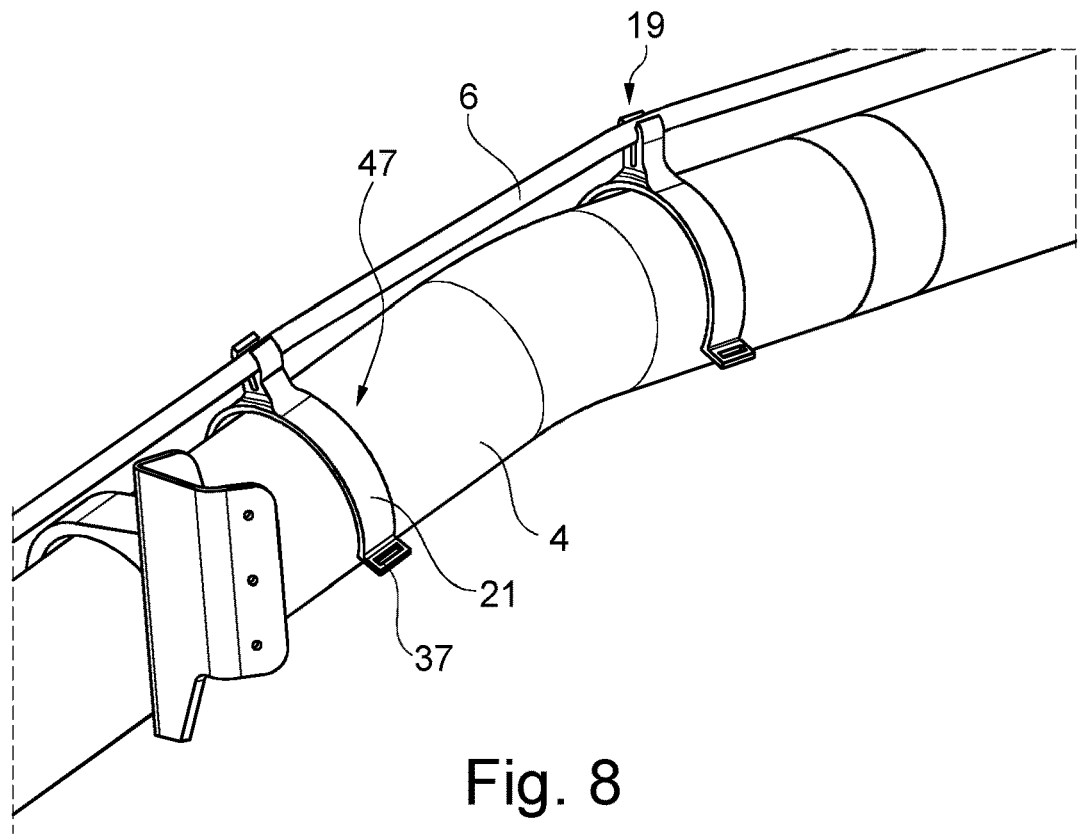
FIG. 8 shows a three-dimensional view with a first line section, a second line section and the second line brackets of FIG. 8.

FIG. 8 shows the second line bracket 47 clamped onto a first line section 4 and holding a second line section 6 in a three-dimensional view.

Figure 9:
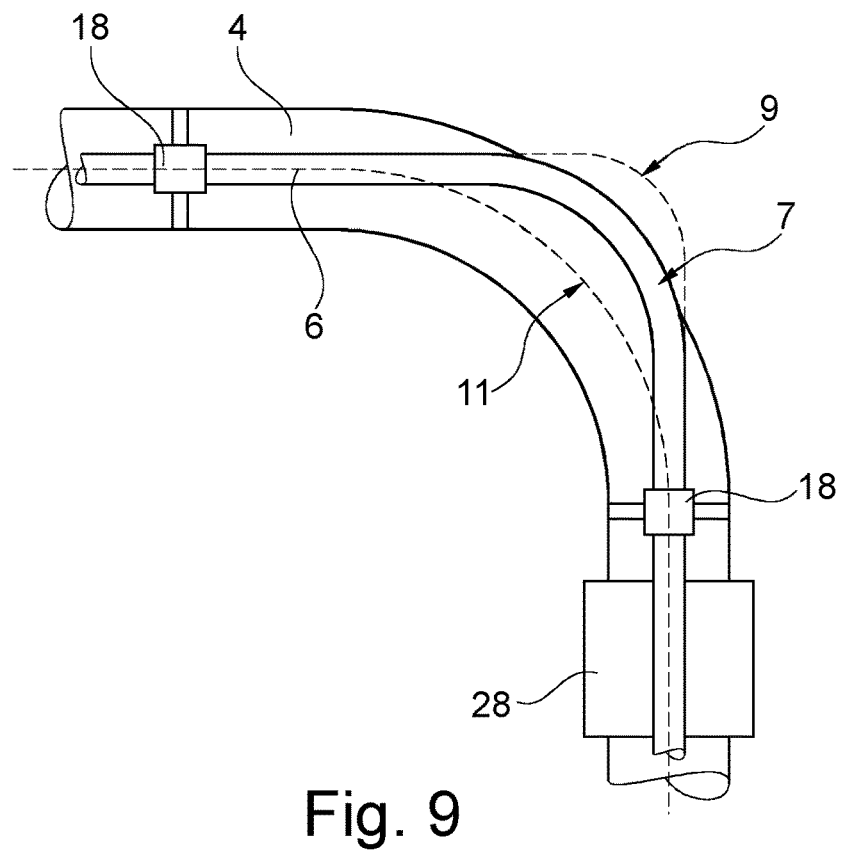
FIG. 9 shows a bend of a first line section.

FIG. 9 demonstrates an attachment of the second line section 6 on a bent first line section 4, which exemplarily constitutes a 90° elbow. Here, the second line section 6 comprises an initial course 7, in which the second line section 6 has a sufficient reserve for a compression of the first line section 4. A resulting course of the second line section 6 is indicated by a dashed line 9. Also, a sufficient reserve for a stretching of the first line section 4 is given, wherein a resulting course of the second line section 6 is indicated by a dashed line 11.

Figure 10:
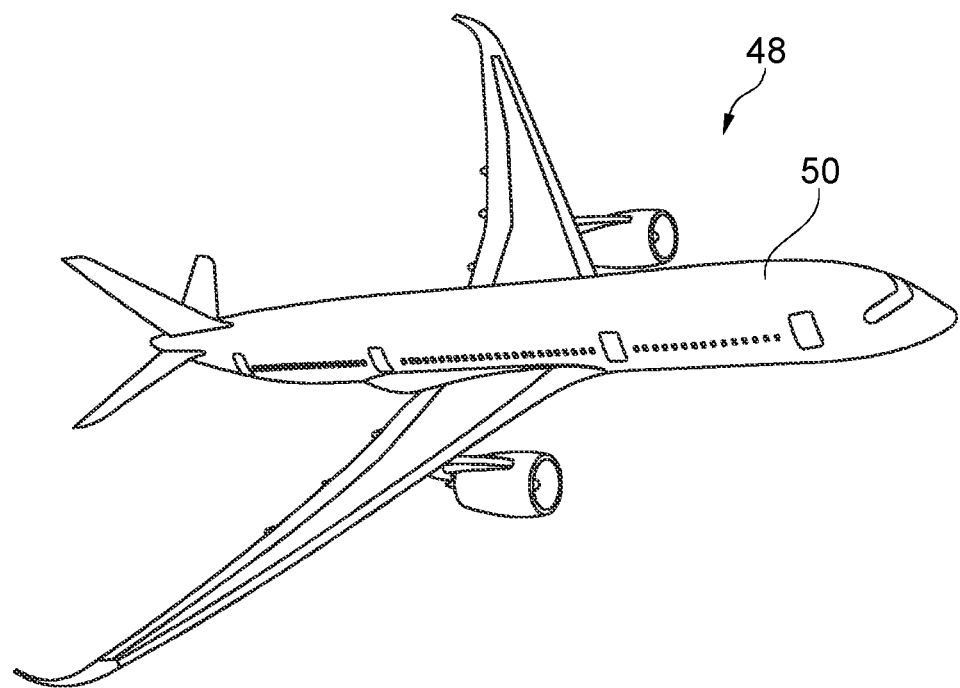
FIG. 10 shows an aircraft.

Furthermore, FIG. 10 shows an aircraft 48 having a fuselage 50 with at least one modular line assembly 2 arranged therein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A modular line assembly for installation in an aircraft fuselage, comprising:
    a first line section having a first diameter,
    at least one second line section having a second diameter,
    a set of first line brackets, and
    a set of second line brackets,
    wherein the first line brackets comprise a first receiving space configured to hold the first line section and a first support portion for attaching the first line brackets to a structural part of the fuselage,
    wherein the first receiving space and the first support portion of at least one of the first line brackets enclose the first line section,
    wherein the second line brackets comprise a second receiving space configured to hold the at least one second line section and a second support portion for attaching the second line brackets to the first line section,
    wherein at least one second line section comprises the same or higher flexibility than the first line section, and
    wherein the at least one second line section is attached to the first line section through a plurality of second line brackets that are arranged at a distance to and are independent from the first line brackets.

2. The modular line assembly according to claim 1, wherein at least one second line bracket is arranged between two consecutive first line brackets.

3. The modular line assembly according to claim 1, wherein the at least one second line section comprises at least one bend in an overlapping region with at least one of one of the first line brackets or another component.

4. The modular line assembly according to claim 1, wherein the second support portion is configured to at least one of glide or rotate on the first line section for compensating at least one of expansion or compression movements of the at least one second line section.

5. The modular line assembly according to claim 1, wherein the first diameter exceeds the second diameter.

6. The modular line assembly according to claim 1, wherein the second line brackets comprise a clamp that encloses the first line section in a plier-like manner.

7. The modular line assembly according to claim 6, wherein the second line brackets comprise a stiction layer in direct contact with a surface of the first line section.

8. The modular line assembly according to claim 1, wherein the second line brackets are configured to hold a plurality of second line sections.

9. The modular line assembly according to claim 1, wherein the second line brackets comprise at least one snap-in connector for holding the at least one second line section.

10. The modular line assembly according to claim 1,
    wherein the second receiving space and the second support portion are provided in a base component and a top component, and
    wherein the base component and top component are connectable to each other through a releasable connector.

11. The modular line assembly according to claim 1,
    wherein the first line section comprises a vacuum pipe, and
    wherein the at least one second line section comprises at least one water hose.

12. The modular line assembly according to claim 1, wherein the first line section is substantially rigid.

13. The modular line assembly according to claim 1, wherein at least one of the at least one second line bracket allows a relative motion of the second line section along a main extension direction of the second line section.

14. An aircraft, comprising:
    a fuselage having an interior space, and
    at least one modular line assembly according to claim 1.

15. A method for installing a first line section and at least one second line section in a fuselage of an aircraft, comprising:
    attaching a first line section having a first diameter to a structural part of the fuselage through first line brackets, which comprise a first receiving space configured to hold the first line section and a first support portion for attaching the first line brackets to the structural part,
    attaching at least one second line section having a second diameter to the first line section through second line brackets, which comprise a second receiving space configured to hold the at least one second line section and a second support portion for attaching the second line brackets to the first line section,
    wherein at least one second line section comprises a higher flexibility than the first line section,
    wherein the first receiving space and the first support portion of at least one of the first line brackets enclose the first line section, and
    wherein the at least one second line section is attached to the first line section through a plurality of second line brackets that are arranged at a distance to and are independent from the first line brackets.

16. The modular line assembly according to claim 1, wherein the set of second line brackets includes a movable second line bracket, wherein at least a portion of the movable second line bracket is configured to rotate about a center line of the first line section, and wherein the second support portion of the movable second line bracket comprises a rotating portion which rotates about the center line of the first line section and a fixed portion which is fixed relative to the first line section.

17. The modular line assembly according to claim 16, wherein the rotating portion comprises an arm that includes the second receiving space and which rotates through an arc relative to the first line section.

18. The modular line assembly according to claim 1, wherein the first support portion comprises an intermediate piece which increases the contact surface with the structural part of the fuselage.

19. The method according to claim 15, wherein the second line brackets include a movable second line bracket, wherein at least a portion of the movable second line bracket is configured to rotate about a center line of the first line section, and wherein the second support portion of the movable second line bracket comprises a rotating portion which rotates about the center line of the first line section and a fixed portion which is fixed relative to the first line section.

20. The method according to claim 19, wherein the rotating portion comprises an arm that includes the second receiving space and which rotates through an arc relative to the first line section.

* * * * *